United States Patent Office 3,644,474
Patented Feb. 22, 1972

3,644,474
PRODUCTION OF ADIPONITRILE
Olav T. Onsager, Waldwick, N.J., assignor to
Halcon International, Inc.
No Drawing. Filed Feb. 24, 1969, Ser. No. 801,757
Int. Cl. C07c *121/26*
U.S. Cl. 260—465.8        20 Claims

ABSTRACT OF THE DISCLOSURE

Process for the production of adiponitrile involving the use of a complex comprised of a transition metal and 3-chloropropionitrile or 3-bromopropionitrile to accomplish this preparation.

BACKGROUND OF THE INVENTION

This invention relates to a process for the reductive dimerization of an organic halo compound with a metal olefin complex and to new compositions of matter. More particularly it relates to a process for the reductive dimerization of a functionally substituted halo organic compound with a metal olefin complex containing a functional group on the olefin moiety. Still more particularly this invention relates to a process for the reductive dimerization of a functionally substituted alkyl, alkenyl, ar-alkyl, ar-alkenyl, cycloalkyl, or cycloalkenyl halide with a metal olefin complex containing a functional group on the olefin moiety.

The extension of carbon chains by the reductive dimerization (coupling) of two groups is well known in the art. Organic coupling has been accomplished for example by the well known Wurtz reaction wherein an organic halide is coupled in the presence of metallic sodium. Similarly metal carbonyls have been employed in coupling reactions of organic halides. However, in these cases the coupling compound has been an activated compound containing activating groups such as allylic, benzylic, gem dihalides and 1,2 dihalides. The art has also demonstrated that non-activated organic halides do not undergo coupling reactions with metal carbonyls.

SUMMARY OF THE INVENTION

It has now been found that functionally substituted organic halogen compounds can undergo a reductive dimerization in the presence of a metal olefin complex, reducing agent. It has also been found that the reductive dimerization may be carried out by preparing the metal olefin complex in situ. As a particular embodiment of the invention it has been found that the reductive dimerization can be carried out within defined temperature limits to obtain high yields of the dimer. It has also been found that the reaction of the halo organic compound with the metal olefin complex at certain temperatures leads first to another complex which upon heating further at higher temperatures results in high yields of dimer. This latter complex can, if desired, be isolated and subsequently treated to form the desired dimer. This complex hereinafter designated as Me·(CO)$_n$·(R)$_m$·(R$_1$)$_p$ is a new composition of matter and another feature of this invention.

Accordingly, it is an object of this invention to prepare dimers from functionally substituted halogenated organic compounds, in the presence of a metal olefin complex. It is also an object of this invention to prepare these dimers by the reaction of these halogenated organic compounds in the presence of a metal carbonyl and an appropriate olefin. It is a further object of this invention to prepare these dimers by the reaction, at elevated temperatures, of new compositions of matter (complex), with these starting halo organic compounds, inert solvents or combinations of both.

DETAILS OF THE INVENTION

The various embodiments of this invention may be described by the following reactions:

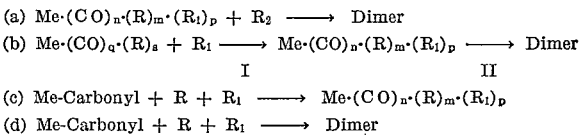

Wherein dimer indicates a coupling of two halo organic compounds by the displacement of the halogen groups and attachment of the carbons which contained these halogens to one another. Me is a transition metal. Suitable metals are the transition metals of Groups V–B, VI–B, VII–B, or VIII of the Periodic Table. Suitable examples of these metals are, Cr, Fe, Co, Ru, Ni, Mn, Mo and W. These metals may be present in the reducing agent in any valence state which is capable of being oxidized but preferably they are in the zero valence state.

R is an unsaturated organic compound (hereinafter called olefin). Suitable olefins are alkenes, dialkenes, polyalkenes, cyclic olefins (cyclic alkenes, dienes and polyenes), aromatic compounds and ar-alkenes. These compounds may be non-halogenated or halogenated functionally substituted olefins, but preferably are non-halogenated or fluoro olefins containing a functional substituent.

Suitable alkenes are those containing from 2 to 12 carbon atoms, preferably lower alkenes of from 2 to 6 carbons such as propylene, butene-2 and the like. These alkenes preferably contain a functional substituent other than halogen, such as cyano, nitro, amino, amido, hydroxy, keto, mercapto, sulfone, sulfoxide, aldehydo, carboxylate (i.e., alkyl esters of from 1 to 6 carbons) carboxylic acid anhydride and the like. Representative examples of these compounds are, acrylonitrile, vinyl alcohol, methacrylonitrile, crotononitrile, acrolein, allyl alcohol, crotonaldehyde, mesityloxide, acrylic acid, and lower alkyl esters of the above acids such as the methyl, ethyl, butyl ester and the like.

The dialkenes may contain from 3 to 12 carbons and preferably 4 to 6 carbons, and may also be substituted as indicated above for the alkenes. These dialkenes may be of the adjacent, conjugated or isolated type as illustrated by 1,2 butadiene, 1,3 butadiene and 1,5 hexadiene. Further, representative examples of these dialkenes are 2-methyl-1,3-butadiene, geraniol, nerol, citronellol, citral and the like. The cyclic olefins may contain from 3 to 20 carbon atoms in the ring but preferably 3 to 12 and especially 3 to 10. Among these cyclic olefins, the cyclic mono, di and trienes are preferred. All of these cyclic olefins can be suitably substituted with functional substituents as shown above for the alkenes, and in the case of cyclic mono olefins those containing functional substituents are preferred. Representative examples of these cyclic olefins are cyclopentadiene, cyclooctadiene-1,5, cycloheptadiene, cyclobutadiene, cyclooctatetraene, cyclododecatriene, cyclohexadiene-1,3, cymene, limonene, 3-menthene and the like. The olefins may also be aromatic compounds such as benzene, bi-phenyl and naphthalene both unsubstituted and substituted with functional substituents as indicated above. Representative compounds are benzene, biphenyl, dichlorobenzene, 2-naphthol, 1-naphthaldehyde, 1-fluoronaphthalene, 2-nitronaphthalene, 1-naphthamide, aniline, nitrobenzene, phenol, 2-aminobiphenyl, 3-nitrobiphenyl, and the like.

The olefin compounds may also be ar-alkenyl and ar-dialkenyl wherein ar- is an aromatic moiety; and the alkenyl, dialkenyl or aromatic moiety have the same definition as indicated above for the alkene, dialkene, and aromatic compounds.

$R_1$ is a functionally substituted halogenated organic compound from which the dimer is formed. The compound may be a chloro, bromo or iodo organic compound and may contain the halogen on a primary or secondary carbon atom. Preferably, however, the compound contains a bromo group and is attached to a primary carbon. The functionally substituted organic moiety may be a paraffin (alkyl), cycloparaffin (cycloalkyl), alkenyl, cycloalkenyl, ar-alkyl, or ar-alkenyl. The substituent, in addition to the halogen mentioned above, may be a cyano, hydroxy, carboxylic acid, carboxylate (alkyl, particularly lower alkyl carboxylates), halo, keto, aldehydo, nitro, amino, amido and the like. The only critical feature of the starting compound is that it contains a halo group on a primary or secondary carbon atom and be substituted with a functional substituent as indicated above. The alkyl compounds may contain a lower alkyl moiety of from 2 to 6 carbons and be such compounds as 3-bromopropionitrile, 3-bromopropylamine hydrobromide, 3-chloropropanol, 3-bromobutanol, ethylenebromohydrin, 3-bromobutyric acid, methyl-4-chlorobutyrate, 3-bromopropionamide, 3-chloronitropentane-1, 1,3 dibromopropane and the like; or substituted halo alkanes of from 7 to 12 carbons such as 6-bromocaproic acid, 8-chlorooctanol and the like. The cycloalkane compounds may contain from 3 to 6 carbon atoms in the ring such as 2-bromocyclohexanol. The alkene compound may be a lower alkenyl (2–6) or an alkenyl of from 7 to 12 carbons, containing functional substituents as indicated above. A representative compound of this class is 4-chlorocrotonic acid. The cycloalkenyl compounds may contain from 3 to 6 carbon atoms in the ring. The ar-alkyl and ar-alkenyl compounds are those containing a phenyl moiety and an alkyl or alkenyl moiety as described above for the alkanes and alkenes. Representative compounds are p-nitro-benzyl chloride, 2(2,4-dichlorophenyl) ethyl bromide and the like.

$R_2$ is a halo organic compound mentioned above ($R_1$) or an inert solvent such as acetonitrile, dimethylformamide and the like, or a mixture of both. In the preferred feature of this embodiment $R_2$ is the same as $R_1$ in the complex and may also be the $R_1$ with a different halogen i.e., $R_1$=3-bromopropionitrile and $R_2$=3-chloropropionitrile. $n$, $m$ and $p$ in the complex are integers, $n$ being from 0 to 5, $m$ being from 0 to 5 and $p$ being from 1 to 6. The sum of $n$, $m$ and $p$ being greater than one and less than 7. $q$ is an integer from zero to five, $s$ is an integer from one to six and the sum of $q$ and $s$ being greater than one and less than seven.

In the more preferred aspects of this invention, the transition metals are: Cr, Fe, Ni, Mn, Ru and Co and especially Ni; the olefin is a substituted lower alkene containing a cyano, hydroxy, keto, aldehydo, amino, carboxylate or carboxylic acid substituent, and especially, amino, cyano and hydroxy; the halo organic compound is a substituted bromo lower alkene or cycloalkane, containing a cyano, aldehydo, hydroxy, amino, amido, nitro, carboxylate or carboxylic acid substituent; and especially a bromo lower alkane containing a cyano, hydroxy, aldehydo, carboxylic acid, or amino substituent; $n$ and $m$ are zero to three, $p$ is 1 to 3, $q$ is an integer from 0 to 4 and $s$ is an integer from 1 to 3.

All of the starting materials i.e., Me, olefin, halo compound etc. may be employed as obtained from commercial sources, that is containing impurities normally associated with these materials.

The preparation of the dimers in accordance with reaction (d) above represents a combination of all of reactions (a) to (c). These latter reactions all take place in situ in reaction (d) under the proper reaction condition. Each of these reactions will be discussed separately as each represents a particular embodiment of this invention.

Reaction (d), and as a consequence reactions (a) to (c), is surprising and unexpected when one considers that the art teaches that non-activated halogen compounds (i.e., non-allylic, non-benzylic, etc.) do not undergo reductive dimerizations with metal carbonyls and that in the reaction of an olefin with a metal carbonyl, a metal olefin complex is formed. For example, nickel carbonyl and pure 3-bromopropionitrile does not undergo a reductive dimerization and nickel carbonyl with acrylonitrile does not yield a dimer but rather bis acrylonitrile nickel. However, 3-bromopropionitrile does undergo a reductive dimerization to adiponitrile, with nickel carbonyl in the presence of acrylonitrile.

In its broadest aspect, the process of this invention is represented by reaction (a) above. The complex, $Me \cdot (CO)_n \cdot (R)_m \cdot (R_1)_p$, can be obtained by reaction (b) or (c) above or is prepared in situ through reaction (d). The composition of this complex catalyst depends at least in part upon the coordination numbers of the metals, the activity of the olefin and halo organic compound with regard to their ability to form complexes with the various metals, and the presence or absence of activating groups attached to the olefin and halo organic compound. For example, in the preparation of these complexes, if the halogenated organic compound ($R_1$) substrate (see reaction b and c) contains coordinating groups which are more active toward the metal than the CO and/or olefin, the complex formed will have a "$p$" value in the higher range of the preferred complexes. For example, in the reaction for the preparation of adiponitrile using Ni carbonyl, 3-bromopropionitrile and acrylonitrile the composition of this complex is Ni (bromopropionitrile)$_3$ both $n$ and $m$ being zero in the above formula and, therefore, no carbonyl or olefin is present in the complex.

Other typical complex compositions which are obtained in this process as described in this application and which are representative of the claimed compositions of this invention, are: (cyclooctadiene)$_2$ Ni 3-bromopropanol, (3-bromopropionitrile)$_3$ Ni, (2-bromoethanol)$_3$ Ni, (maleic anhydride) Fe · (3-bromopropionamide)$_2$, (cycloheptatriene) Co (CO)$_2$ (2-bromoethanol), (acrylonitrile) Mn (CO)$_2$ (3-chloropropionitrile), (acrylonitrile)$_3$ Mo (CO) (3-bromopropionitrile), (cyclopentadienyl) Co (CO) (3-bromo-1-nitropropane), Cr (3-bromopropylamine)$_3$. It is not intended that the structures shown above represent the way in which the organic compounds are attached to the metal. The structure is given only to demonstrate that the complex is made up of certain organic moieties and the metal. For example, the mode of attachment can be the coordination of the halogen substituent of the $R_1$ compound to the metal, and/or the attachment of the functional group to the metal. For example, a compound containing a halogen and a cyano would be coordinated to the metal with both the halo and cyano moiety. Similarly the metal can be inserted between the halogen and the carbon to which it is attached.

In the complex, Me, R and $R_1$ may be any of the materials defined previously. In the preferred complex $R_1$ corresponds to the non-halogenated unsaturated compound (R) from which it may be obtained and which may be used in the overall reaction. For example, if $R_1$ is 3-bromopropionitrile, R is acrylonitrile. Also, in the preferred complex of this invention Me, R and $R_1$ are those preferred materials defined previously, and $n$, $m$, and $p$ are each 0 to 3, 0 to 3 and 1 to 3 respectively.

In reaction (a) above, the coupling to form the dimer is performed by heating the complex at 80 to 225° C., but preferably 110 to 200° C. and especially 140 to 180° C. The reaction is carried out by heating the complex in a polar solvent, in a halo organic compound ($R_1$) or in combination of both. The polar solvent may be an inert solvent such as the olefin (R) (i.e., acrylonitrile) acetonitrile, dimethylformamide, N methylpyrrolidone, bis (2-methoxyethylether) and the like. Preferably the reaction is carried out in the presence of a halo organic compound and especially the halo organic compound corresponding to the $R_1$ of the complex. The molar ratio of halo organic compound to metal employed in the reaction is 1:1 to 500:1 but preferably 3:1 to 100:1 and especially 5:1 to 50:1. The pressure of reaction is not critical and suitably sub or super atmospheric pressures may be employed. The pressure is such so as to maintain a liquid phase. The product thus formed generally exists at least in part complexed to the metal halide by-product, starting material and/or solvent etc. The pure product may be recovered from the reaction system, by conventional techniques for disassociation of a complex. For example, the dimer which is attached to the metal may be displaced with another compound which has a greater affinity toward the metal than the dimer. This can be accomplished, for example, by extraction techniques such as hydrolysis of the reaction product, by reaction of this product with ethers, phosphines and the like. Similarly, also, the dimer complex may be broken by heating the complex. Also, the dimer may be liberated by changing the oxidation state of the metal, for example, reduction (i.e., $Ni^{+2}$ to $Ni^0$). Alternatively the dimer may be liberated by distillation. In the preferred embodiment of this aspect of the invention the reaction product mixture is treated with water at temperatures of 0° C. to 150° C. and preferably 10° C. to 100° C., in order to solubilize the metal halide by-product into the water phase thus formed and to decompose any organic complex, which then settles in the organic phase. The amount of water is not critical and suitable .01 to 1000% water by volume, based on the total volume of reactants may be used but preferably 5 to 50% water is employed. The organic phase can be then distilled to recover the desired dimer product. Alternatively the dimer product may be recovered by reducing the metal complex with hydrogen to form the metal in its reduced state and liberated dimer. Also, the dimer product may be recovered by distilling the reaction product by means well known in the art for distillation techniques.

As an additional embodiment of the invention the dimer product or alternatively the $Me \cdot (CO)_n \cdot (R)_m \cdot (R_1)_p$ complex is prepared as shown in reaction (b). The starting Me olefin complex $Me \cdot (CO)_q \cdot (R)_s$, can be suitably prepared by methods well known in the art for the reaction of a metal carbonyl with an olefin. For example, the metal carbonyl is refluxed with the appropriate olefin compound, until the desired reaction is substantially complete. Examples of such olefin complexes are as follows: (cinnamaldehyde)$_2$ Ni, (cyclooctadiene)$_2$ Ni, (octafluoro-1,4-cyclohexadiene) Fe (CO)$_3$, (cyclobutadiene) Fe (CO)$_3$, (hexatriene) Fe$_2$ (CO)$_8$ (m-divinylbenzene) Fe$_2$ (CO)$_4$, (methylmethacrylate) Fe (CO)$_4$, (maleic anhydride) Fe (CO)$_4$, [(cyclopentadienyl) (CO) Fe (CO)$_2$ Ni (cyclopentadienyl)], [(butadiene) Co (CO)$_2$]$_2$, (cyclopentadienyl) Co (duroquinone), (acrylonitrile) Mn$_2$ (CO)$_9$, (butadiene) Mn$_2$ (CO)$_8$, (benzene)$_2$ Cr, biphenyl (Cr (CO)$_3$)$_2$, (p-dichlorobenzene) Cr (CO)$_3$, (acrylonitrile)$_3$ Cr (CO)$_3$, cycloheptatriene) Cr (CO)$_3$, (acrylonitrile)$_3$ Mo (Co)$_3$, (butadiene)$_2$ Mo (CO)$_2$, as well as those additional ones shown in col. 7, lines 35 through 48. The complex composition of this invention (step 1 or reaction b) is formed by reaction of the Me olefin complex with the appropriate halo organic compound ($R_1$), at temperatures of 20 to 150° C. but preferably 50 to 110° C. The halo organic compound may act as a solvent as well as reactant, and therefore the ratio of halo organic compound to Me·olefin complex may suitably be 1:1 to 100:1 but preferably 5:1 to 50:1 and especially 10:1 to 20:1. If desired, an inert solvent may be employed to act as solvent. It is preferred, however, that the halo organic compound act as both solvent and reactant. The pressure employed is not critical and, therefore, any desired pressure may be employed, both sub and super atmospheric, but preferably atmospheric. The complex thus formed (reaction b) may then be reacted if desired, to form the desired dimer as described above for reaction (a). Preferably, reaction b is carried out by carrying out step (1) at a temperature of 20 to 150° C. (especially 50 to 110° C.) to form the complex and subsequently continued heating at temperatures of 110 to 200° C. and especially 140 to 180° C. to form the dimer. If desired, the product mixture may be subsequently converted to essentially all free dimer.

Alternatively the complex $Me \cdot (CO)_n \cdot (R)_m \cdot (R_1)_p$ in reaction (b) may be formed by preparing the Me olefin complex starting material of reaction (b) in situ, as shown in reaction step (c). In this reaction the complex product of step (1) reaction (b), is suitably formed by reaction of a metal carbonyl with an olefin (R) and an appropriate halo organic compound ($R_1$) at temperatures of 20 to 150° C., and especially 50 to 110° C. The molar ratio of the halo organic compound to metal is suitably at least 1:1, preferably 5:1 to 100:1 and especially 10:1 to 50:1. The molar ratio of olefin compound to metal is broadly 1:100 to 100:1, but preferably 1:1 to 20:1 and especially 2:1 to 10:1.

Reaction (d) represents the overall reactions of steps (a) to (c) carried out in situ. This reaction may be carried out at temperatures of 20 to 200° C., however, when reaction temperatures above approximately 130° C. are employed at the start-up of the reaction, little dimer product is formed. It is believed that this occurs because at higher temperatures intermediate products as illustrated in reactions (b) and (c) are not formed in any substantial amount. It has been found that when the entire reaction is to be carried out in situ, high yields of product dimer are obtained if the reaction is carried out at various temperatures, starting with relatively low temperature to prepare the intermediates and finally higher temperature to form the dimer from the last intermediate (reaction a). Accordingly, as another embodiment of this invention and as a preferred feature, reaction (d) is first carried out at a temperature of from 20 to 150° C. and especially 50 to 110° C. for a sufficient time to allow the various intermediates to form in substantial amounts and finally heating the reaction at temperatures of 80 to 225° C., preferably 110 to 200° C. and especially 140 to 180° C. The point at which the temperature is suitably increased is easily determined by calculation of the amount of CO evolved and/or by changes in the color of the reaction. Generally the first phase of the reaction is carried out from 1 to 10 hours, but preferably 1 to 5 hours. The length that this first phase is carried out is not critical; too short a reaction time will result in less intermediate being formed and as a consequence less final product. The molar ratios of all starting material, pressure and other factors are identical to those shown for reaction (c) above. Similarly, isolation of the dimer product is accomplished as shown above for reaction (a).

In reactions (a), (b) and (d) wherein the final dimer product is formed, the metal reactant is oxidized to a higher oxidation level and as a by-product a metal halide is formed. The halide is, at least in part, in the form of a complex with product and/or other organic material in the mixture. After disassociation, as described previously, the separated metal halide may conveniently be reduced back to the original oxidation level (i.e., by the use of $H_2$), and reused to prepare the metal carbonyl starting material (i.e., by reaction of the metal with CO). As a by-product of this reduction a hydrogen halide is also formed which can suitably be used to prepare the desired halo organic compound starting material from an appropriate precursor. For example, the nickel bromide formed in the reaction can be reduced to nickel and HBr, the nickel can be used to prepare $Ni(CO)_4$ and the HBr can be reacted with acylonitrile to form 3-bromopropionitrile. It can readily be seen, therefore, that the process of this invention can suitably be made into a continuous process, wherein the various by-products can be regenerated back into the system.

The dimer products prepared according to this invention may be used as solvents, or intermediates to form commercial products such as plastics, plastic fibers, detergents and dyes. The complex compositions claimed as part of this invention may be suitably used as catalysts for dimerizations, codimerization, cyclization and polymerization of mono and di olefins as well as alkynes.

Although the invention has been described including its various embodiments and preferred features, the following represents a combination of what has already been described in various parts of the specification with regard to the most preferred feature of this invention including the most preferred process conditions and starting materials; the olefins (R) are acrylonitrile, allyl alcohol, acrylic acid, 3-nitroprene, methacrylonitrile and acrolein; these olefins may be described by the following structural formula:

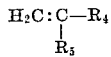

wherein $R_4$ is CN, $CH_2OH$, COOH, $CH_2NO_2$, and CHO; and $R_5$ is hydrogen, or hydrogen or $CH_3$ when $R_4$ is CN. The halo organic compounds are, 3-bromopropionitrile, 3-chloropropionitrile, 3-bromopropanol-1, 3-chloropropanol-1, 3-bromopropanoic acid, 3-chloropropanoic acid, 3-bromo-1-nitropropane, 3-chloro-1-nitropropane, 3-bromoisobutyronitrile, 3-chloroisobutyronitrile, 3-bromopropane-1-al and 3-chloropropane-1-al; the halo compounds may be represented by the following structural formula:

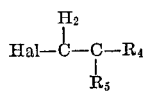

wherein $R_4$ and $R_5$ is as above and Hal is bromo or chloro. The metals are Ni, Fe, Co and Cr; the metal carbonyls are $Ni(CO)_4$, $Fe(CO)_5$, $Fe_2(CO)_9$, $Fe_3(CO)_{12}$, $Co_2(CO)_8$ and $Cr(CO)_6$; and the metal olefin complexes are $Ni(acrylonitrile)_2$, $Ni(methacrylonitrile)_2$, $Ni(acrolein)_2$, $Ni(acrylic\ acid)_2$, $Fe(acrylonitrile)(CO)_4$, $Cr(acrylonitrile)_3(CO)_3$, $Cr(acrylonitrile)(CO)_5$, $Cr(acrylonitrile)_2(CO)_4$, $Co_2(acrylonitrile)(CO)_7$, $Fe(methacrylonitrile)(CO)_4$, $Cr(methacrylonitrile)_3(CO)_3$, $Cr\ methacrylonitrile)(CO)_5$, $Cr(methacrylonitrile)_2(CO)_4$, $Co_2(methacrylonitrile)(CO)_7$, $Fe(acrolein)(CO)_4$, $Cr(acrolein)_3(CO)_3$, $Cr(acrolein)(CO)_5$, $Cr(acrolein)_2(CO)_4$, $Co_2(acrolein)(CO)_7$, $Fe(acrylic\ acid)(CO)_4$, $Cr(acrylic\ acid)_3(CO)_3$, $Cr(acrylic\ acid)(CO)_5$, $Cr(acrylic\ acid)_2(CO)_4$, $Co_2(acrylic\ acid)(CO)_7$.

The preferred processes using the starting materials shown above, are reactions (c) and (d) above. Using acrylonitrile, 3-bromopropionitrile and $Ni(CO)_4$ as an example, reaction (d) is carried out by heating a mixture of these materials first at a temperature of 50 to 100° C. for a sufficient time to allow the various intermediates to be formed in substantial quantities and subsequently heating the reaction mixture at temperatures of 110 to 200° C. until the reaction is complete. The reaction mixture is then distilled to recover product material, or is treated with water to separate product material from complex. The molar ratio of 3-bromopropionitrile to Ni is 10:1 to 50:1 and the molar ratio of acrylonitrile to Ni is 1:1 to 20:1. The reaction may also be carried out by employing an inert solvent and/or by employing a mixture of 3-bromopropionitrile and 3-chloropropionitrile, for example a small amount of the bromo compound and a greater amount of chloro compound. However, the reaction is best carried out with only 3-bromopropionitrile. Similarly, the reaction may be carried out with a mixture of $Ni(CO)_4$ and one or more of the other metal carbonyls indicated above, although using $Ni(CO)_4$ alone is best.

Using bisacrylonitrile nickel, and 3-bromopropionitrile as an example, reaction (c) is carried out by heating a mixture of these materials as shown above for reaction (d) under the same condition and variations as shown (reaction d).

The following examples are given by way of illustration.

EXAMPLE 1(A)

Preparation of adiponitrile 97.8 grs. 3-bromopropionitrile, 24.0 grs. acrylonitrile and 3.9 ml. (30 mmoles) $Ni(CO)_4$ are charged to a 200 ml. stainless steel pressure vessel which has been evacuated to less than 1 mm. Hg and filled with argon to atmospheric pressure.

The reaction mixture is heated at 90° C. for 4 hrs. with agitation. During this time evolution of 2.5 liters (25° C.), of CO gas is measured. The temperature is then raised to 150° C. for an additional 10 hrs.

After cooling down the reaction vessel to room temperature a small sample of the reaction mixture is hydrolyzed with water and analyzed by gas chromatography. The reaction products are 2.4 grs. adiponitrile and a small amount of propionitrile besides unreacted 3-bromopropionitrile and acrylonitrile.

The adiponitrile is separated from the reaction mixture by fractional distillation leaving the reducing agent mainly in its oxidized form as residue.

EXAMPLE 1(B)

Similarly when Example 1A is carried out at 40° C. or 70° C. for 128 hours and 16 hours respectively instead of 90° C. for 4 hours; and 120° C., 180° C., or 200° C., for 80, 1.5, or 0.5 hours respectively instead of 150° C. for 10 hours, similar results are obtained.

Similarly 1,6-hexanediol, 1,4-butanediol, 1,6-hexanediamide, 1,6-dinitrohexane, or 1,6-diaminohexane is prepared according to the procedure of Example 1(A) above, by replacing; 3-bromopropionitrile with an equivalent amount of 3-bromopropanol, 2-bromoethanol, 2-bromopropionamide, 3-bromo-1-nitropropane or 3-bromopropylamine respectively; by replacing acrylonitrile with an equivalent amount of cyclooctadiene, maleic anhydride, cyclopentadiene, respectively; and by replacing nickel carbonyl with iron carbonyl, cobalt carbonyl, or chromium carbonyl respectively.

Similarly when Fe, Co or Cr (as their carbonyls) is used in place of Ni carbonyl on the above Example 1(A) similar results are obtained.

Similarly when, allyl alcohol, acrylic acid, 3-nitropropene, methacrylonitrile or acrolein is used in place of acrylonitrile in the above Example 1(A) similar results are obtained.

Similarly when, 3-bromopropanol-1, 3-bromopropionic acid, 3-bromo-1-nitropropane, 3-bromopropane-1-al or 3-bromoisobutyronitrile is used in place of 3-bromopropionitrile in Example 1(A) above there is obtained 1,6-dihydroxyhexane, adipic acid, 1,6-dinitrohexane, 1,6-hexanedial or 2,5-dimethyl-1,6-dicyanohexane, respectively.

EXAMPLE 2

Preparation of $Ni(3$-bromopropionitrile$)_3$

To a 500 ml. 3 neck glass flask fitted with a condenser, stirrer and dropping funnel is charged 100 ml. 3-bromopropionitrile and 40 ml. acrylonitrile. The condenser is connected to a precision water gas-test-meter. The reaction mixture is heated with stirring to 80° C. in an oil bath. Over a period of 2 hrs. 13.0 ml. $Ni(CO)_4$ diluted with 10 ml. acrylonitrile is added to the reaction mixture from the dropping funnel. After the addition of $Ni(CO)_4$ is complete the mixture is heated to 80° C. for an additional 2 hrs. During the reaction evolution of 8.5 l. of CO gas is measured. The almost clear dark green solution is filtered under argon. To the stirred filtrate is slowly added 500 ml. of abs. benzene. During the addition of benzene a green tacky solid precipitates from the solution. The mixture with the solids is stirred overnight. The crystalline solid formed is then filtered off under argon, washed with benzene and n-pentane and dried in vacuum at room temperature. The green solid so obtained weighs 40.5 grs. and is characterized by the following physical data:

Elementary analysis: Ni=12.7%, ionic bromide=35.1% (determined by AgNO$_3$-titration after dissolving the complex in water), total bromine=48.0%, C=24.0%, N=8.9% and H=2.7%. (Theory for Ni(3-bromomopropionitrile)$_3$ is Br=52.1%, Ni=12.7%, C=23.5%, N=9.1%, H=2.6%.)

Color: Light green (dry), darker green in solution.
Typical IR.-absorptions: 2303 cm.$^{-1}$, 1715 cm.$^{-1}$, 1275 cm.$^{-1}$, 1100 cm.$^{-1}$ and 893 cm.$^{-1}$.
Thermal stability: The complex starts to decompose at a temperature of about 85° C.

Solubility: The complex is soluble in coordinating solvents, in particular, solvents containing nitrile groups such as acetonitrile, 3-bromopropionitrile and 3-chloropropionitrile. It is insoluble in benzene, heptane, cyclohexane and the like. It dissolves in water with formation of 3-bromopropionitrile as a separate phase.

Similarly (cyclooctadiene)$_2$ Ni·(3 - bromopropanol), (2-bromoethanol)$_3$Ni, (maleic anhydride) Fe·(3-bromopropionamide)$_2$, (cycloheptatriene)·Co·(CO)$_2$·(2 - bromoethanol), (acrylonitrile)·Mn·(CO)$_3$·(3 - chloropropionitrile), (acrylonitrile)$_3$ Mo·(CO)·(3-bromopropionitrile), (cyclopentadienyl)·Co·(CO)·(3 - bromo-1-nitropropane) or Cr·(3-bromopropylamine)$_3$ is prepared by the above procedure using equivalent amounts of the following reagents in place of 3-bromopropionitrile, acrylonitrile, and nickel carbonyl; 3-bromopropanol, cyclooctadiene and nickel carbonyl; 2-bromoethanol, acrylonitrile and nickel carbonyl; 3-bromopropionamide, maleic anhydride and iron carbonyl; 2-bromoethanol, cycloheptadiene and cobalt carbonyl; 3-chloropropionitrile, acrylonitrile and manganese carbonyl; 3-bromopropionitrile, acrylonitrile and molybdenum carbonyl; 3-bromo-1-nitropropane, cyclopentadiene and cobalt carbonyl; 3-bromopropylamine acrylonitrile and chromium carbonyl.

Similarly when Example 2 above is carried out at 50° C., 100° C. or 125° C. for 16 hours, .5 hour, or 15 minutes, respectively instead of 80° C. for 2 hrs. in both occurrences, similar results are obtained.

Similarly, when the olefins of Examples 1(B) are used in place of acrylonitrile above, similar results are obtained.

EXAMPLE 3

Preparation of Ni(3-bromopropionitrile)$_3$ 16.5 grs. of bis-acrylonitrile nickel (prepared from Ni(CO)$_4$ and acrylonitrile according to G. N. Schrauzer, J. Am. Chem. Soc., vol. 81, p. 5310 (1959)) are reacted with 100 ml. 3-bromopropionitrile in a 500 ml. glass flask fitted with magnetic stirring and condenser at 80° C. for 4 hrs. During this time a dark green almost homogeneous solution is obtained. By using the same work up procedure as described in Example 2, 36.0 grs. of a crystalline green solid is obtained which, according to its physical data, is identical with the green solid made in Example 2.

Similarly when Example 3 above is carried out at 50° C., 100° C. or 125° C. for 32 hours, 1 hour or 15 minutes respectively, instead of 80° C. for 4 hours, similar results are obtained.

EXAMPLE 4

Preparation of adiponitrile 10.0 grs. of Ni (3-bromopropionitrile)$_3$ from Example 2 and 32.6 grs. of 3-bromopropionitrile are added to a dry 75 ml. stainless steel pressure vessel, which has been previously evacuated to less than 1 mm. Hg and filled with argon to atmospheric pressure. The reaction vessel is then heated at 150° C. for 18 hrs. with agitation. The reaction mixture is cooled to room temperature, washed with 25 ml. water and then analyzed by LVP gas chromatography.

Reaction products: 1.3 grs. adiponitrile, 0.4 gr. propionitrile. Using the Ni(3-bromopropionitrile)$_3$ from Example 3 gives similar results.

Similarly 1,6 hexanediol, 1,4 butanediol, 1,6 hexanediamide, 1,6 dinitrohexane, or 1,6 diaminohexane is prepared in accordance with Example 4 above, when (cyclooctadiene)$_2$ Ni. 3-bromopropanol, (2-bromoethanol)$_3$ Ni, (maleic anhydride) Fe·(3-bromopropionamide)$_2$, (cyclopentadienyl)·Co(CO)·(3-bromo-1-nitropropane) or Cr·(3-bromopropylamine)$_3$ respectively, is used in place of Ni(3 - bromopropionitrile)$_3$; and 3 - bromopropanol, 2-bromoethanol, 3-bromopropionamide, 2-bromo-1-nitropropane or 3-bromopropylamine, respectively is used in place of 3-bromopropionitrile.

Similarly when Example 4 above is carried out at 120° C., 180° C. or 200° C. for 144 hours, 2.25 hours, or .5 hour, respectively, instead of 150° C. for 18 hours, similar results are obtained.

EXAMPLE 5

For this example the experimental procedure of Example 4 is used.

Charge: 10.0 grs. Ni(3-bromopropionitrile)$_3$, 32.6 grs. 3-bromopropionitrile+8.0 grs. acrylonitrile.

Reaction product obtained: 1.9 grs. adiponitrile, 0.2 gr. propionitrile.

EXAMPLE 6

For this example the experimental procedure of Example 4 is used.

Charge: 10.0 grs. Ni(3-bromopropionitrile)$_3$+35.0 grs. 3-chloropropionitrile

Reaction product obtained: 1.3 grs. adipontrile, 0.3 gr. propionitrile.

EXAMPLE 7

The experimental procedure of Example 4 is followed using 35.0 g. of N-methylpyrrolidone in place of 3-bromopropionitrile, to obtain 0.2 gm. of adiponitrile.

EXAMPLE 8

For this example the experimental procedure of Example 4 is used.

Charge: 16.5 g. bis-acrylonitrile nickel, 35.0 g. 3-chloropropionitrile

Reaction conditions: 6 hrs. at 80° C., then 18 hrs. at 150° C.

As reaction product, adiponitrile is detected qualitatively by LVP gas chromatography.

Similarly, when 2-bromoethanol, 3-bromo-propylamine, 3-bromopropionamide, or 4-bromocyclohexanol is used in place of 3-chloropropionitrile in the above example, there is obtained 1,4-butanediol, 1,6-hexamethylenediamine, hexanediamide, and bis(4,4-dihydroxy)-bicyclohexyl respectively.

EXAMPLE 9

Using the experimental procedure of Example 8, 3-bromopropanal is dimerized to 1,6-hexandial (detected by LVP gas chromatography) by using Ni(acrolein)$_2$ as the reducing agent.

EXAMPLE 10

Using the experimental procedures and conditions of Example 8, 3-bromopropionitrile is dimerized to adiponitrile using Ni (fumarylnitriles)$_2$, Ni (cinnamaldehyde)$_2$, (octafluoro-1,4-cyclohexadien) Fe (CO)$_3$, [methyl]$_3$ Sn·(CF$_2$=CF$_2$) Mn (CO)$_5$, (maleic anhydride) Fe (CO)$_4$, (vinylchloride) Fe (CO)$_4$, (acrylonitrile)$_3$ Cr (CO)$_3$, (acrylonitrile), Mo (CO)$_3$, (cyclooctadiene)$_2$ Ni cycloheptatriene) Co (CO)$_3$, (acrylonitrile) Mn (CO)$_4$, (acrylonitrile)$_3$ Mo (CO)$_3$ (cyclopentadienyl) Co (CO)$_2$ or bis benzene chromium as the reducing agent in place of bisacrylonitrile nickel.

Similarly, when 3-chloropropionitrile is used with the above reducing agents in place of 3-bromopropionitrile, adiponitrile is formed.

What is claimed is:

1. A process for preparing adiponitrile which comprises intimately contacting in the liquid phase a composition of the formula:

$$Me \cdot (CO)_n \cdot (R)_m \cdot (R_1)_p$$

wherein
Me is Cr, Fe, Co, Ru, Ni, Mn, Mo, or W
R is acrylonitrile;
$R_1$ is 3-chloropropionitrile or 3-bromopropionitrile; $n$ and $m$ being from zero to five, and $p$ being from one to six; the sum of $n$, $m$ and $p$ being greater than one and less than seven; with a compound selected from the group consisting of a solvent, a functionally substituted halogenated organic compound ($R_1$) as indicated above and mixtures thereof, at temperatures of 80 to 225° C.

2. A process for preparing adiponitrile, which comprises intimately contacting Ni(3-bromopropionitrile)$_3$ with 3-chloropropionitrile, 3-bromopropionitrile or a solvent, or mixtures thereof, at a temperature of 80 to 225° C.

3. A process for preparing adiponitrile which comprises contacting Ni(3-bromopropionitrile)$_3$ with 3-bromopropionitrile at a temperature of 110 to 200° C., wherein the molar ratio of 3-bromopropionitrile to Ni is 5:1 to 50:1.

4. A process for preparing adiponitrile which comprises intimately contacting in the liquid phase a composition of the formula:

$$Me \cdot (CO)_n \cdot (R)_m \cdot (R_1)_p$$

wherein
Me is Cr, Fe, Co, Ru, Ni, Mn, Mo or W;
R is acrylonitrile;
$R_1$ is 3-chromopropionitrile or 3-bromopropionitrile; $n$ and $m$ being from zero to five, and $p$ being from one to six, the sum of $n$, $m$ and $p$ being greater than one and less than seven; with a compound selected from the group consisting of a solvent, and ($R_1$) compound as indicated above and mixtures thereof, at temperatures of 80 to 225° C., to form a product mixture containing a complex and (b) treating said product mixture to disassociate said complex and to produce the free adiponitrile.

5. A process for preparing adiponitrile which comprises intimately contacting Ni(3-bromopropionitrile)$_3$ with 3-chloropropionitrile, 3-bromopropionitrile, or a solvent or mixture thereof at a temperature of 80 to 225° C. to form a product mixture containing a complex; and treating said product mixture to disassociate said complex and to produce the free adiponitrile.

6. The process of claim 5 wherein 3-bromopropionitrile is used, the temperature of reaction is 110 to 200° C., the molar ratio of 3-bromopropionitrile to Ni is 5:1 to 50:1, and the treating step is a distillation or water extraction.

7. A process for preparing adiponitrile which comprises, in combination, the steps of:
(a) intimately contacting in the liquid phase a metal olefin complex of the formula Me(CO)$_q$·(R)$_s$ wherein Me is Cr, Fe, Co, Ru, Ni, Mn, Mo or W, R is acrylonitrile, $q$ is a number from 0 to 5, $s$ is a number from one to six, and the sum of $q$ and $s$ is greater than one less than seven; with 3-chloropropionitrile or 3-bromopropionitrile at a temperature of 20 to 200° C., the molar ratio of 3-chloropropionitrile or 3-bromopropionitrile to metal (Me) being from 1:1 to 100:1.

8. A process for preparing adiponitrile which comprises, intimately contacting bisacrylonitrile nickel with 3-bromopropionitrile at a temperature of 50 to 110° C., and subsequently raising the temperature to 110 to 200° C., the molar ratio of 3-bromopropionitrile to nickel being from 5:1 to 50:1.

9. A process for preparing adiponitrile which comprises in combination the steps of:
(a) intimately contacting in the liquid phase a metal olefin complex of the formula Me(Co)$_q$·(R)$_s$ wherein Me is Cr, Fe, Co, Ru, Ni, Mn, Mo, or W, R is acrylonitrile, $q$ is a number from 0 to 5, $s$ is a number from one to six, and the sum of $q$ and $s$ being greater than one and less than seven; with 3-chloropropionitrile or 3-bromopropionitrile the molar ratio of 3-chloropropionitrile or 3-bromopropionitrile to metal (Me) being from 1:1 to 100:1, at a temperature of 20 to 200° C., to form a product mixture containing a complex; and
(b) treating said product mixture to disassociate said complex and to produce the free adiponitrile.

10. The process of claim 9 wherein the treating step (b) is a distillation or water extraction.

11. A process for preparing adiponitrile which comprises in combination the steps of:
(a) intimately contacting bisacrylonitrile nickel with 3-bromopropionitrile at a temperature of 20 to 200° C., the molar ratio of 3-bromopropionitrile to nickel being from 1:1 to 100:1 to form a product mixture containing a complex; and (b) treating said product mixture to disassociate said complex and to produce the free adiponitrile.

12. The process of claim 11 wherein the materials are reacted at a temperature of 50 to 110° C., and subsequently raising the temperature to 110 to 200° C., the molar ratio of 3-bromopropionitrile to Ni being 5:1 to 50:1; and the treating step (b) is a distillation or water extraction.

13. A process for preparing adiponitrile which comprises: intimately contacting in the liquid phase a Me carbonyl, wherein Me is Cr, Fe, Co, Ru, Ni, Mn, Mo or W with an olefin R which is acrylonitrile and a functionally substituted halogenated organic compound ($R_1$) which is 3-chloropropionitrile or 3-bromopropionitrile at a temperature of 20 to 200° C.; wherein the molar ratio of the functionally substituted halogenated organic compound ($R_1$) to Me is at least 1:1 and the molar ratio of olefin R to Me is 1:100 to 100:1.

14. The process of claim 13 wherein the initial temperature of reaction is 50 to 110° C. and the temperature is subsequently raised to 110 to 200° C.

15. A process for preparing adiponitrile which comprises, intimately contacting Ni(CO)$_4$, 3-bromopropionitrile and acrylonitrile at a temperature of 20 to 200° C., the molar ratio of 3-bromopropionitrile to Ni is at least 1:1 and the molar ratio of acrylonitrile to Ni is 1:100 to 100:1.

16. The process of claim 15 wherein the initial temperature of reaction is 50 to 100° C. and the temperature is subsequently raised to 110 to 200° C.; the molar ratio of 3-bromopropionitrile to Ni is 5:1 to 50:1 and the molar ratio of acrylonitrile to Ni is 1:1 to 20:1.

17. A process for preparing adiponitrile which comprises intimately contacting in the liquid phase a Me carbonyl, wherein Me is Cr, Fe, Co, Ru, Ni, Mn, Mo, or W with an olefin R which is acrylonitrile and a functionally substituted halogenated organic compound ($R_1$) which is 3-chloropropionitrile or 3-bromopropionitrile wherein the molar ratio of halo organic compounds ($R_1$) to Me is at least 1:1, the molar ratio of olefin R to Me is 1:100 to 100:1, at a temperature of 20 to 200° C. to form a product mixture containing a complex; and (b) treating said product mixture to disassociate said complex and to produce the free adiponitrile.

18. The process of claim 17 wherein the initial temperature of reaction of step (a) is 50 to 100° C. and the temperature is subsequently raised to 110 to 200° C.

19. A process for preparing adiponitrile which comprises, in combination, the steps of:
(a) intimately contacting Ni(CO)$_4$, 3-bromopropionitrile and acrylonitrile at a temperature of 20 to 200° C., the molar ratio of 3-bromopropionitrile to Ni is at least 1:1 and the molar ratio of acrylonitrile to Ni is 1:100 to 100:1 to form a product mixture containing a complex; and (b) treating said product mixture to disassociate the complex and to form the free adiponitrile.

20. The process of claim 19 wherein the initial temperature of reaction is step (a) is 50 to 100° C. and the temperature is subsequently raised to 110 to 200° C.; the molar ratio of 3-bromopropionitrile to Ni is 5:1 to 50:1 and the molar ratio of acrylonitrile to Ni is 1:1 to 20:1, and the treating step (b) is a distillation or water extraction.

References Cited

UNITED STATES PATENTS 2,524,833  10/1950  Prichard et al. _____ 260—465.8
2,956,075  10/1960  Boffa et al. _____ 260—465.8

JOSEPH P. BRUST, Primary Examiner

U.S. Cl. X.R.

260—429, 438.5, 439, 464, 465.1, 465.9, 468, 485, 514, 537, 563, 583, 631, 635, 644, 648, 652